United States Patent Office 3,121,753
Patented Feb. 18, 1964

3,121,753
HALOBENZYL SUBSTITUTED POLYHALO-
BUTADIENES
John P. Luvisi, Park Ridge, and Louis Schmerling, River-
side, Ill., assignors to Universal Oil Products Company,
Des Plaines, Ill., a corporation of Delaware
No Drawing. Filed Dec. 27, 1960, Ser. No. 78,217
3 Claims. (Cl. 260—651)

This invention relates to novel compositions of matter which may be employed as insecticides and to a method for the preparation thereof. More particularly the invention is concerned with a process for condensing halo substituted alkadienes or cycloalkadienes with halo substituted alkyl aromatic compounds in the presence of a decomposing peroxide.

One object of this invention resides in a process for condensing halo substituted unsaturated compounds with halo substituted alkyl aromatic compounds in the presence of a decomposing peroxide to form novel compositions of matter which possess insecticidal properties.

A further object of this invention is found in a process for condensing halo conjugated alkadienes or halo conjugated cycloalkadienes with a substitued alkyl aromatic compound in the presence of a decomposing peroxide to form insecticidal compositions of matter.

One embodiment of this invention resides in a process which comprises condensing a halogenated compound selected from the group consisting of chloro substituted alkadienes and chloro substituted cycloalkadienes with a halo nuclearly substituted alkyl aromatic compound, in the presence of a decomposing peroxy compound catalyst at condensation conditions, and recovering the resultant reaction product.

A further embodiment of the invention is found in a process which comprises condensing a chloro substituted conjugated cycloalkadiene in which at least one chlorine atom is attached to each of the doubly bonded carbon atoms with a halo nuclearly substituted alkyl aromatic compound, in the presence of an organic peroxide catalyst at a temperature at least as high as the decomposition temperature of said organic peroxide catalyst, and recovering the resultant condensation product.

Yet another embodiment of the invention is found in a process which comprises condensing hexachlorocyclopentadiene with a halo nuclearly substituted alkyl aromatic compound, in the presence of an organic peroxide catalyst at a temperature at least as high as the decomposition temperature of said organic peroxide catalyst, and recovering the resultant condensation product.

A specific embodiment of the invention is found in a process which comprises condensing hexachlorocyclopentadiene with p-chlorotoluene in the presence of di-t-butyl peroxide at a temperature in the range of from about 130° to about 150° C., and recovering the resultant pentachloro - (4-chlorobenzyl) - 1,3-cyclopentadienes.

Other objects and embodiments referring to alternative chloro substituted conjugated alkadienes, chloro substituted conjugated cycloalkadienes, halo nuclearly substituted alkyl aromatic compounds and decomposing peroxides will be found in the following further detailed description of this invention.

It has now been found that certain chloro substituted alkadienes or chloro substituted cycloalkadienes, namely those in which at least one chlorine atom is attached to each doubly bonded carbon atom, may be condensed with a halo substituted alkyl aromatic compound in which the halo substituents are positioned on the nucleus of the aromatic ring, in the presence of a decomposing peroxide catalyst at a temperature at least as high as the decomposition temperature of the catalyst, to form compositions of matter which possess insecticidal properties. For example, hexachlorocyclopentadiene may be condensed with p-chlorotoluene to form 2,3,4,5,5-pentachloro-1-(4-chlorobenzyl)1,3,-
cyclopentadiene,
1,2,3,4,5-pentachloro-5-(4-chlorobenzyl)-1,3-
cyclopentadiene, and
1,3,4,5,5-pentachloro-2-(4-chlorobenzyl)-1,3-
cyclopentadiene, which possess insecticidal activity, especially against houseflies. In addition to possessing insecticidal activity the compounds formed by the process of this invention will also find a wide variety of uses in the chemical field, particularly being used as intermediates in the preparation of resins, pharmaceuticals, plastics, etc.

Unsaturated chlorinated compounds containing only carbon, hydrogen and halogen atoms which may be reacted with the nuclearly substituted alkyl aromatic compound in the process of the present invention include straight chain halogenated conjugated alkadienes having the general formula

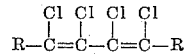

in which each of the R radicals in independently selected from the group consisting of hydrogen, alkyl, halo and haloalkyl radicals containing from 1 to 6 carbon atoms, or polyhalocycloalkadienes containing only carbon, hydrogen and halogen atoms having the general formula:

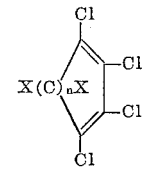

in which X is independently selected from the group consisting of hydrogen, alkyl, halo and haloalkyl radicals. Examples of these compounds include haloalkadienes such as
1,2,3,4-tetrachloro-1,3-butadiene,
hexachloro-1,3-butadiene,
1,2,3,4-tetrachloro-1,3-pentadiene,
1,2,3,4,5-pentachloro-1,3-pentadiene,
1,2,3,4-tetrachloro-1,3-hexadiene,
1,2,3,4,5-pentachloro-1,3-hexadiene,
2,3,4,5-tetrachloro-2,4-hexadiene, etc.;
and halocycloalkadienes, such as halogenated 1,3-cyclopentadienes which for purposes of this invention will be designated as halogenated cyclopentadienes including
1,2,3,4-tetrachlorocyclopentadiene,
1,2,3,4,5-pentachlorocyclopentadiene,
hexachlorocyclopentadiene,
1,2,3,4-tetrachloro-1,3-cyclohexadiene,
1,2,3,4,5-pentachloro-1,3-cyclohexadiene,
1,2,3,4,5,5-,
1,2,3,4,5,6-, and
1,2,3,4,6,6-hexachloro-1,3-cyclohexadiene,
octachloro-1,3-cyclohexadiene,
1,2,4,5-tetrachloro-1,4-cyclohexadiene,
1,2,3,4,5-pentachloro-1,4-cyclohexadiene,
1,2,3,4,5,6- and
1,2,3,3,4,5-hexachloro-1,4-cyclohexadiene,
heptachloro-1,4-cyclohexadiene,
octachloro-1,4-cyclohexadiene, etc.
In addition, it is also contemplated that polyhaloalkadienes and polyhalocycloalkadienes which are used in this process may contain more than one species of halo substituents, such as, for example,
1,4-difluoro-1,2,3,4-tetrachloro-1,3-butadiene, 1,4-dibromo-1,2,3,4-tetrachloro-1,3-butadiene,
1,4-diiodo-1,2,3,4-tetrachloro-1,3-butadiene,
5,5-difluoro-5,5-dibromo-, and
5,5-diiodo-1,2,3,4-tetrachloro-1,3-cyclopentadienes, etc., may also be used although not necessarily with equivalent results.

Nuclearly substituted aromatic hydrocarbons which may be utilized include nuclearly substituted alkyl benzenes containing only carbon, hydrogen and halogen radicals as the preferred starting material, said alkyl benzenes having the generic formula

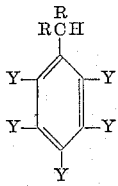

in which R is independently selected from the group consisting of hydrogen, alkyl or cycloalkyl, or both R's together are part of a cycloalkyl ring and Y is selected from the group consisting of hydrogen, alkyl, cycloalkyl, aryl, aralkyl, alkaryl, halogen radicals, said halogen radicals including fluorine, chlorine, bromine and iodine, at least one Y being a halogen radical. Specific examples of these preferred nuclearly substituted alkyl benzenes include o-chlorotoluene,
m-chlorotoluene,
p-chlorotoluene,
o-bromotoluene,
m-bromotoluene,
p-bromotoluene,
o-iodotoluene,
m-iodotoluene,
p-iodotoluene,
o-fluorotoluene,
m-fluorotoluene,
p-fluorotoluene,
o-chloroethylbenzene,
m-chloroethylbenzene,
p-chloroethylbenzene,
o-bromoethylbenzene,
m-bromoethylbenzene,
p-bromoethylbenzene,
o-iodoethylbenzene,
m-iodoethylbenzene,
p-iodoethylbenzene,
o-fluoroethylbenzene,
m-fluoroethylbenzene,
p-fluoroethylbenzene,
o-chloropropylbenzene,
m-chloropropylbenzene,
p-chloropropylbenzene,
o-bromopropylbenzene,
m-bromopropylbenzene,
p-bromopropylbenzene,
o-iodopropylbenzene,
m-iodopropylbenzene,
p-iodopropylbenzene,
3,5-dichlorotoluene,
3,5-dibromotoluene,
3,5-diiodotoluene,
3,5-difluorotoluene,
3,5-dichloroethylbenzene,
3,5-dibromoethylbenzene,
3,5-diiodoethylbenzene,
3,5-difluorotoluene,
3,4,5-trichlorotoluene,
3,4,5-tribromotoluene,
3,4,5-triiodotoluene,
3,4,5-trifluorotoluene,
3,4,5-trichloroethylbenzene,
3,4,5-tribromoethylbenzene,
3,4,5-triiodoethylbenzene,
2,3,4,5-tetrachlorotoluene,
2,3,4,5-tetrabromotoluene,
2,3,4,5-tetraiodotoluene,
2,3,4,5-tetrafluorotoluene,
2,3,4,5-tetrachloroethylbenzene,
2,3,4,5-tetrabromoethylbenzene,
2,3,4,5-tetraiodoethylbenzene,
2,3,4,5,6-pentachlorotoluene,
2,3,4,5,6-pentabromotoluene,
2,3,4,5,6-pentaiodotoluene, the pentachloro, pentabromo-, pentaiodo- and pentafluoroethylbenzenes, etc. It is also contemplated within the scope of this invention that alkyl aromatic compounds containing more than one aromatic ring may also be utilized although not necessarily with equivalent results, examples of said compounds including 4-chloro-1-methylnaphthalene,
4-bromo-1-methylnaphthalene,
4-iodo-1-methylnaphthalene,
4-fluoro-1-methylnaphthalene,
2-chloro-1-methylnaphthalene,
2-bromo-1-methylnaphthalene,
2-iodomethylnaphthalene,
3-chloro-1-methylnaphthalene,
3-bromo-1-methylnaphthalene,
3-iodo-1-methylnaphthalene,
4-chloro-1-anthracene,
4-bromo-1-methylanthracene,
4-iodo-1-methylanthracene,
2-chloro-1-anthracene,
2-bromo-1-methylanthracene,
2-iodo-1-methylanthracene,
2-fluoro-1-methylanthracene,
3-chloro-1-anthracene,
3-bromo-1-methylanthracene,
3-iodo-1-methylanthracene,
4-chloro-1-phenanthrene,
4-bromo-1-methylphenanthrene,
4-iodo-1-methylphenanthrene,
2-chloro-1-phenanthrene,
2-bromo-1-methylphenanthrene,
2-iodo-1-methylphenanthrene,
3-chloro-1-phenanthrene,
2-bromo-1-methylphenanthrene,
3-iodo-1-methylphenanthrene,
4-chloro-1-chrysene,
4-bromo-1-methylchrysene,
4-iodo-1-methylchrysene,
2-chloro-1-chrysene,
2-bromo-1-methylchrysene,
2-iodo-1-methylchrysene,
3-chloro-1-chrysene,
3-bromo-1-methylchrysene,
3-iodo-1-methylchrysene, the di- and tri-halo substituted aforementioned compounds, etc.

The catalysts which may be used in the present process are those which are capable of forming free radicals under the reaction conditions. These include peroxy compounds, containing the bivalent radical -O-O- which decomposes to form free radicals which initiate the general reaction of the present invention and which are capable of inducing the condensation of the chloro substituted alkadiene or cycloalkadiene with the halo nuclearly substituted alkyl aromatic compound. Examples of these catalysts include the persulfates, perborates, percarbonates of ammonium and of the alkali metals, organic peroxy compounds. The organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, cumene, hydroperoxide, diisopropylbenzyl hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounded with calcium sulfate, benzoyl peroxide compounded with camphor, etc. Only catalytic amounts (less than stoichiometric amounts) need be used in the process.

The reaction which occurs may be indicated as follows:

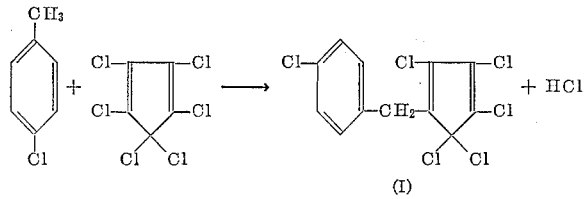

The reaction product may contain not only 2,3,4,5,5-pentachloro-1-(4-chlorobenzyl)-1,3 - cyclopentadiene (I) but also some of the isomeric products 1,2,3,4,5-pentachloro-5-(4-chlorobenzyl)-1,3-cyclopentadiene (II) and 1,3,4,5,5-pentachloro-2-(4-chlorobenzyl)-1,3 - cyclopentadiene (III).

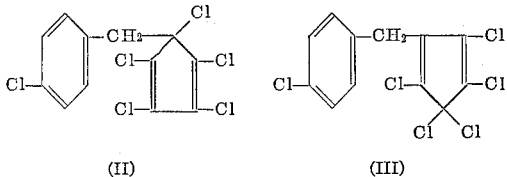

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely the chloro substituted alkadiene or chloro substituted cycloalkadiene and the halo substituted aromatic compound, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such as the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts. Thus it is within the skill of one familiar with the art to select the particular temperature needed for any particular catalyst. However, the operating temperatures generally do not exceed the decomposition temperature of the catalyst by more than about 150° C. since free radical generating catalysts decompose rapidly under such conditions. For example, when a free radical generating catalyst such as t-butyl perbenzoate is used, having a decomposition temperature of approximately 115° C., the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of condensation reaction between the halogenated alkadienes or cycloalkadienes and the halo substituted alkyl aromatic compound. However, the increased rate of reaction is accompanied by certain amounts of decomposition. In addition to the elevated temperatures which are utilized the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants it is necessary to utilize pressure withstanding equipment to insure liquid phase conditions. In batch type operations it is often desirable to utilize pressure withstanding equipment, to charge the reactants and catalyst to the vessel, and to pressure the vessel with 10, or 30 or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to several hours, depending upon temperature and half life of the catalyst. Generally speaking, contact times of at least 10 minutes are preferred.

It is also contemplated within the scope of this invention that the products obtained by condensing the chloro substituted conjugated alkadiene or chloro substituted conjugated cycloalkadiene with the halo nuclearly substituted alkyl aromatic compound may be further reacted with other dienophiles such as maleic anhydride, ethylene, bicycloheptene, bicycloheptadiene, etc., to yield other compositions of matter which are novel in structure and which will also possess insecticidal activity. For example the compound 2,3,4,5,5-pentachloro-1-(4-chlorobenzyl)-1,3-cyclopentadiene which is prepared by condensing hexachloropentadiene with p-chlorotoluene may be further condensed with bicycloheptadiene at an elevated temperature of from about 50° to about 250° C. or more and at a pressure ranging from about 1 to about 100 atmospheres or more in a Diels-Alder manner to yield 2,3,4,10,10 - pentachloro - 1 - (4 - chlorobenzyl)-1,4,4a,5,8,8a - hexahydro - 1,4,5,8 - dimethanonaphthalene, the latter compound also possessing insecticidal properties.

The physical properties of the present chloro alkadiene or chloro cycloalkadienic derivatives of a halo substituted alkyl aromatic compound, and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison with the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so desired, the insecticide of the present invention may be combined with a diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be as low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration depends upon the method utilized to apply the insecticidal composition to the infested article. In addition to the use of normal solvents, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of the present invention may be effected in any suitable manner and may comprise either a batch or a continuous type operation. For example, when a batch type operation is used, a quantity of the starting materials comprising a chloro substituted conjugated alkadiene or chloro substituted conjugated cycloalkadiene along with the halo nuclearly substituted alkyl aromatic compound are placed in an appropriate apparatus provided with heating and mixing means along with a catalytic amount of the organic peroxy compound. If the reaction is to be effected at atmospheric temperatures a condensation flask is sufficient. However, in the event that temperatures higher than those normally used are to be employed along with a correspondingly higher pressure the aforesaid feed stocks may be condensed by being placed in the glass liner of a rotating autoclave along with the catalyst and thereafter sealing said liner into said rotating autoclave. The desired pressure is effected by the introduction of an inert gas such as nitrogen and the apparatus is thereafter heated to the desired operating temperature. Upon completion of the desired residence time the flask or autoclave along with the contents thereof are cooled to room temperature. Any excess pressure is vented and the reaction product is separated from any remaining catalyst and/or side reaction products and recovered by conventional means such as fractional distillation, crystallization, etc.

Another method of effecting the condensation reaction of the present type is by a continuous type operation. In this type of operation the starting materials comprising the chloro substituted alkadiene or chloro substituted cycloalkadiene and the halo nuclearly substituted alkyl aromatic compound are continuously charged to a reaction zone which is maintained at the proper operating conditions of temperature and pressure. These starting materials may be charged to the reaction zone through separate lines, or if so desired may be combined before entry into said reactor and charged thereto in a single line. The reaction zone may comprise an unpacked vessel or coil or may be lined with an adsorbent packing material such as fire brick, alumina, dehydrated bauxite and the like. The peroxy compound which acts as a catalyst may also be continuously charged to the reaction zone through separate lines in a catalytic amount per amount of starting material. After a desired residence time has elapsed the reaction product is continuously withdrawn, separated from the reactor effluent and purified by conventional means hereinbefore set forth.

If it is desired that the reaction products thus obtained are to be utilized as intermediates in the preparation of other insecticidal compositions of matter by condensing these products with other dienophiles the reaction may be effected, either in a batch type operation or in a continuous type operation, in a manner similar to that hereinbefore set forth, the only difference being that the latter reaction will proceed in a Diels-Alder manner in the absence of any catalytic matter.

Examples of reaction products which may be obtained by the condensation process of the present invention include 1-(4-fluorobenzyl)-1,2,3,4,4-pentachloro-1,3-butadiene,
1-(4-chlorobenzyl)-1,2,3,4,4-pentachloro-1,3-butadiene,
1-(4-bromobenzyl)-1,2,3,4,4-pentachloro-1,3-butadiene,
1-(4-iodobenzyl)-1,2,3,4,4-pentachloro-1,3-butadiene,
1-(2-fluorobenzyl)-1,2,3,4,4-pentachloro-1,3-butadiene,
1-(2-chlorobenzyl)-1,2,3,4,4-pentachloro-1,3-butadiene,
1-(2-bromobenzyl)-1,2,3,4,4-pentachloro-1,3-butadiene,
1-(2-iodobenzyl)-1,2,3,4,4-pentachloro-1,3-butadiene,
1-(4-fluorobenzyl)-2,3,4,5,5-pentachloro-1,3-butadiene,
1-(4-chlorobenzyl)-2,3,4,5,5-pentachloro-1,3-butadiene,
1-(4-bromobenzyl)-2,3,4,5,5-pentachloro-1,3-butadiene,
1-(4-iodobenzyl)-2,3,4,5,5-pentachloro-1,3-cyclopentadiene,
1,2,3,4,5-pentachloro-5-(4-fluorobenzyl)-1,3-cyclopentadiene,
1,2,3,4,5-pentachloro-5-(4-chlorobenzyl)-1,3-cyclopentadiene,
1,2,3,4,5-pentachloro-5-(3-fluorobenzyl)-1,3-cyclopentadiene,
1,2,3,4,5-pentachloro-5-(3-chlorobenzyl)-1,3-cyclopentadiene,
1,2,3,4,5-pentachloro-5-(2-fluorobenzyl)-1,3-cyclopentadiene,
1,2,3,4,5-pentachloro-5-(2-chlorobenzyl)-1,3-cyclopentadiene,
1,2,3,4,5-pentachloro-5-(4-bromobenzyl)-1,3-cyclopentadiene,
1,2,3,4,5-pentachloro-5-(4-iodobenzyl)-1,3-cyclopentadiene,
1,2,3,4,5-pentachloro-5-(3-bromobenzyl)-1,3-cyclopentadiene,
1,2,3,4,5-pentachloro-5-(3-iodobenzyl)-1,3-cyclopentadiene,
1,2,3,4,5-pentachloro-5-(2-bromobenzyl)-1,3-cyclopentadiene, 1,2,3,4,5-pentachloro-5-(2-iodobenzyl)-1,3-cyclopentadiene,
1,3,4,5,5-pentachloro-2-(4-chlorobenzyl)-1,3-cyclopentadiene,
1,3,4,5,5-pentachloro-2-(3-chlorobenzyl)-1,3-cyclopentadiene,
1,3,4,5,5-pentachloro-2-(2-chlorobenzyl)-1,3-cyclopentadiene,
1,3,4,5,5-pentachloro-2-(4-bromobenzyl)-1,3-cyclopentadiene,
1,3,4,5,5-pentachloro-2-(4-iodobenzyl)-1,3-cyclopentadiene,
1,3,4,5,5-pentachloro-2-(3-bromobenzyl)-1,3-cyclopentadiene,
1,3,4,5,5-pentachloro-2-(3-iodobenzyl)-1,3-cyclopentadiene,
1,3,4,5,5-pentachloro-2-(2-bromobenzyl)-1,3-cyclopentadiene,
1,3,4,5,5-pentachloro-2-(2-iodobenzyl)-1,3-cyclopentadiene, etc.

It is to be understood that the aforementioned compounds are only representative of the type of compound which may be obtained from the present process, and that this invention is not limited thereto.

The following examples are given to illustrate the process of the present invention which, however, are not intended to limit the generally broad scope of the present invention in strict accordance therewith.

Example I

A mixture of 41 g. of hexachlorocyclopentadiene, 140 g. of p-chlorotoluene and 8 g. of di-t-butyl peroxide was placed in the glass liner of a rotating autoclave. The glass liner was sealed into the autoclave and an initial pressure of 30 atmospheres was reached by pressing in nitrogen gas. The autoclave and contents thereof were heated to a temperature of about 130° C. and maintained in a range of from about 130° C. to about 140° C. for a period of about 4 hours. At the end of this time the autoclave and contents thereof were cooled to room temperature, the excess pressure was vented and the autoclave was opened. The reaction product comprised 186 g. of a clear pale golden amber liquid in which hydrogen chloride and some moisture were present. The product was extracted with n-pentane, the extract was washed with water and dilute caustic, dried and subjected to fractional distillation under reduced pressure. A cut boiling at 140–142° C. at 0.35 mm. pressure was recovered. The cut which was crystalline in nature was then recrystallized from hot methyl alcohol yielding crystals having a melting point of 70.5–71° C. This cut comprising 2,3,4,5,5-pentachloro-1-(4-chlorobenzyl)-1,3-cyclopentadiene mixed with 1,3,4,5,5-pentachloro-2-(4-chlorobenzyl)-1,4-cyclopentadiene and 1,2,3,4,5-pentachloro-5-(4-chlorobenzyl)-1,3-cyclopentadiene was analyzed with the following results.

Calculated for: $C_{12}H_6Cl_6$: C, 39.71; H, 1.67; Cl, 58.62. Found: C, 40.14; H, 1.97; Cl, 56.68.

Example II

A mixture of 50 g. of hexachloro-1,3-butadiene and 200 g. of p-chlorotoluene along with 8 g. of di-t-butyl peroxide is placed in the glass liner of a rotating autoclave which is thereafter sealed into the autoclave and nitrogen pressed in until an initial pressure of about 30 atmospheres is reached. The autoclave and contents thereof are then heated to a temperature of about 130° C. and maintained at 130° to 140° C. for a period of about 4 hours. At the end of this time the autoclave and contents thereof are cooled to room temperature, the excess pressure is vented and the reaction product is separated and recovered. This product is then extracted with n-pentane following which it is washed with water and caustic, dried and subjected to fractional distillation under reduced pressure. The cut comprising 1-(4-chlorobenzyl)-1,2,3,4,4-pentachloro-1,3-butadiene or, as it may also be called, 5-(4-chlorophenyl)-1,1,2,3,4-pentachloro-1,3-pentadiene is separated and recovered.

Example III

In this experiment, a mixture of 76 g. of o-chlorotoluene, 81 g. of hexachlorocyclopentadiene and 8 g. of di-t-butyl peroxide was placed in the glass liner of a rotating autoclave. The glass liner was sealed into the autoclave and nitrogen pressed in until an initial pressure of about 30 atmospheres had been reached. The autoclave was then heated at a temperature of about 130° to 140° C. for a period of about 4 hours. At the end of this time the autoclave and contents thereof were cooled to room temperature, the excess pressure was vented and the autoclave opened. The reaction product was separated and treated in a manner similar to that set forth in Example I above. The desired product comprising 2,3,4,5,5-pentachloro-1-(2-chlorobenzyl)-1,3-cyclopentadiene along with smaller portions of 1,2,3,4,5-pentachloro-5-(2-chlorobenzyl)-1,3-cyclopentadiene and 1,3,4,5,5-pentachloro-2-(2-chlorobenzyl)-1,3-cyclopentadiene were recovered by fractional distillation.

Example IV

A mixture of 0.6 mole of 3,5-dichlorotoluene and 0.3 mole of 1,2,3,4-tetrachloro-1,3-butadiene is heated in the presence of a di-t-butyl peroxide catalyst at a temperature of about 130° to about 140° C. for a period of about 4 hours. At the end of this time the condensation apparatus and the contents thereof are cooled to room temperature and the reaction product is treated in a manner similar to that set forth in Example I above. The desired product comprising 1-(3,5-dichlorobenzyl)-2,3,4-trichloro-1,3-butadiene is recovered upon fractional distillation under reduced pressure.

Example V

A mixture of 0.6 mole of 2,4-dibromotoluene and 0.3 mole of hexachlorocyclopentadiene is treated in a manner similar to that set forth in the above examples. Upon completion of the desired residence time the reaction product is recovered, extracted with n-pentane, washed with water and dried and subjected to fractional distillation under reduced pressure. The desired product comprising 2,3,4,5,5-pentachloro-1-(2,4-dibromobenzyl)-1,3-cyclopentadiene, 1,2,3,4,5-pentachloro-5-(2,4-dibromobenzyl)-1,3-cyclopentadiene and 1,3,4,5,5-pentachloro-2-(2,4-dibromobenzyl)-1,3-cyclopentadiene is recovered.

Example VI

An insecticidal solution is prepared by dissolving 1 g. of 2,3,4,5,5-pentachloro-1-(4-chlorobenzyl)-1,3-cyclopentadiene in 1 cc. of benzene, the resulting solution then being added to 100 cc. of water using 1 cc. of Triton X–100 as an emulsifying agent. The resulting solution is then sprayed into a cage containing houseflies and will cause a 100% knock-down. Similar tests using solutions prepared from the compounds disclosed in Examples II to V above will show similar results.

We claim as our invention:
1. A halobenzyl-pentachloro-1,3-butadiene.
2. 1-(3,5-dichlorobenzyl)-2,3,4-trichloro-1,3-butadiene.
3. 1-(4-chlorobenzyl)-1,2,3,4,4-pentachloro-1,3-butadiene.

References Cited in the file of this patent

UNITED STATES PATENTS

| | | |
|---|---|---|
| 2,894,994 | Schmerling | July 14, 1959 |
| 2,894,995 | Schmerling | July 14, 1959 |